United States Patent [19]
Lee

[11] Patent Number: 5,566,377
[45] Date of Patent: Oct. 15, 1996

[54] HEAT DISSIPATING APPARATUS

[76] Inventor: Richard Lee, 7F, No. 152-1, Sec. 7, Chung Shan N. Rd., Taipei, Taiwan

[21] Appl. No.: 500,410

[22] Filed: Jul. 10, 1995

[51] Int. Cl.$^6$ .................................................. H05K 7/20
[52] U.S. Cl. ........................ 361/695; 165/80.3; 174/16.1
[58] Field of Search .................................. 165/80.3, 122; 174/15.1, 16.1; 361/687–699; 415/175–177

[56] References Cited

U.S. PATENT DOCUMENTS

| | | | |
|---|---|---|---|
| 4,674,004 | 6/1987 | Smith et al. | 361/693 |
| 5,067,047 | 11/1991 | Azar | 361/391 |
| 5,144,531 | 9/1992 | Go et al. | 361/702 |
| 5,297,005 | 3/1994 | Gourdine | 361/697 |

FOREIGN PATENT DOCUMENTS

| | | | |
|---|---|---|---|
| 2585918 | 2/1987 | France | 361/694 |

OTHER PUBLICATIONS

Damm, Jr., "Convection Coding Apparatus" IBM Tech Disclosure Bulletin, vol. 20, No. 7, Dec. 1977, pp. 2755–2756.

*Primary Examiner*—Gregory D. Thompson
*Attorney, Agent, or Firm*—Browdy and Neimark

[57] ABSTRACT

A heat dissipating apparatus installed in a computer or the like to dissipate heat, the heat dissipating apparatus including an air duct system consisting of a plurality of air hoses, main air ducts, branch air ducts and air outlet tubes, a fan controlled to draw air out or blow air into the air duct system, a plurality of air duct holders installed in the computer or the like to hold the air duct system in place, a plurality of piezoelectric membranes respectively mounted on said duct system and controlled by a pulse generator to vibrate the air duct system so as to destroy a barrier of heat inside the air duct system, wherein each main air duct has an air intake at one end, an air outlet at an opposite end, a neck portion between the air intake and the air outlet, and at least one side hole sealed with an air valve flap for mounting a branch air duct.

10 Claims, 14 Drawing Sheets

HEAT DISSIPATING APPARATUS

BACKGROUND OF THE INVENTION

The present invention relates to a heat dissipating apparatus installed in a computer and operated to carry cooling air into the computer or to carry heat out of the computer.

Various heat dissipating apparatus, including fans, thermal control circuits, heat sinks, cooling couplers, etc., have been developed and intensively used in computer systems and electronic apparatus for carrying heat away from the electric parts and electronic components. FIG. 1 shows an axial-flow fan designed for this purpose. According to wind tunnel tests, the amount of wind of the axial-flow fan shown in FIG. 1 is about 0.109 Q (CMM) and its wind pressure is about 1.9 Ps (mmAg) (see FIG. 2). As the wind pressure is low, when the amount of wind is driven out, it is immediately dissipated. Because of the limitation of the installation position and the uni-direction of the axial flow, this structure of axial-flow fan cannot effectively carry heat away from the designated component parts. Still another drawback of this structure of axial-flow fan is its limited application because of its huge axial dimension. Furthermore, regular heat dissipating apparatus can only be used for carrying heat away from a limited area or specific component parts of the computer or electronic apparatus. If to arrange a heat dissipating apparatus in a computer mainframe to cool down most parts of the computer mainframe, the cost is high.

SUMMARY OF THE INVENTION

It is one object of the present invention to provide a heat dissipating apparatus which eliminates the aforesaid drawbacks. It is another object of the present invention to provide a heat dissipating apparatus which can be conveniently installed in a computer mainframe or electronic instrument and arranged in all directions to efficiently cool down all the component parts of the computer mainframe or electronic instrument. It is still another object of the present invention to provide a heat dissipating apparatus which can be controlled to draw heat away from the computer mainframe or electronic instrument with which the apparatus is mounted, or to blow cooling air into the computer mainframe or electronic instrument.

According to one aspect of the present invention, the heat dissipating apparatus comprises an air duct system consisting of a plurality of air hoses, main air ducts, branch air ducts and air outlet tubes, a fan controlled to draw air out of said air duct system or to blow air into said air duct system, a plurality of air duct holders installed in the computer or the like to hold the air duct system in place, a plurality of piezoelectric membranes respectively mounted around the air duct system and controlled by pulse generating means to beat the air duct system so as to destroy barrier of heat inside the air duct system, wherein the main air ducts each comprises an air intake at one end, an air outlet at an opposite end, a neck portion between the air intake and the air outlet, and at least side hole sealed with an air valve flap for mounting a branch air duct each; the diameters of the air intake and the air outlet are gradually reducing toward the neck portion; the air outlet tubes each has longitudinal rows of air holes through the periphery.

According to another aspect of the present invention, the fan comprises an aluminum base plate, a top cover, a circuit board, a winging, a bushing, an axle bearing, a fan body, and a connector, wherein, the aluminum base plate has opposite pairs of notches at two opposite lateral sides, a plurality of mounting holes around the border, a circular center recess, which receives the circuit board, a center hole at the center of the circular center recess, and a wire groove radially extended from the circular center recess to the border for mounting an electric wire; the winding is mounted on the circuit board, defining a center hole aligned with a center through hole on the circuit board and the center hole on the aluminum base plate; the bushing is inserted into the center hole of the winding to hold the axle bearing on the inside; the fan body has a fan shaft inserted through the axle bearing into the center hole on the aluminum base plate and retained in place by a clamp, and a plurality of radial slant blades around the periphery; the top cover has a raised chamber, which receives the fan body, a plurality of ribs radially extended from the raised chamber on the outside, a plurality of mounting holes on the ribs respectively connected to the mounting holes on the aluminum base plate by screws, an air outlet at one lateral side, and an air inlet at the center of the raised chamber; the connector has two supporting arms at two opposite ends respectively supported inside the air outlet at two opposite sides, two hooks respectively extended from the supporting arms and hooked on the periphery of the air outlet, and a front coupling hole for coupling the air hoses.

According to still another aspect of the present invention, the aluminum base plate of the fan is covered with a heat conductive adhesive tape for adhering to the CPU of a computer for permitting heat to be quickly carried away from the CPU when the fan is operated to cause currents of air.

Figure 1:
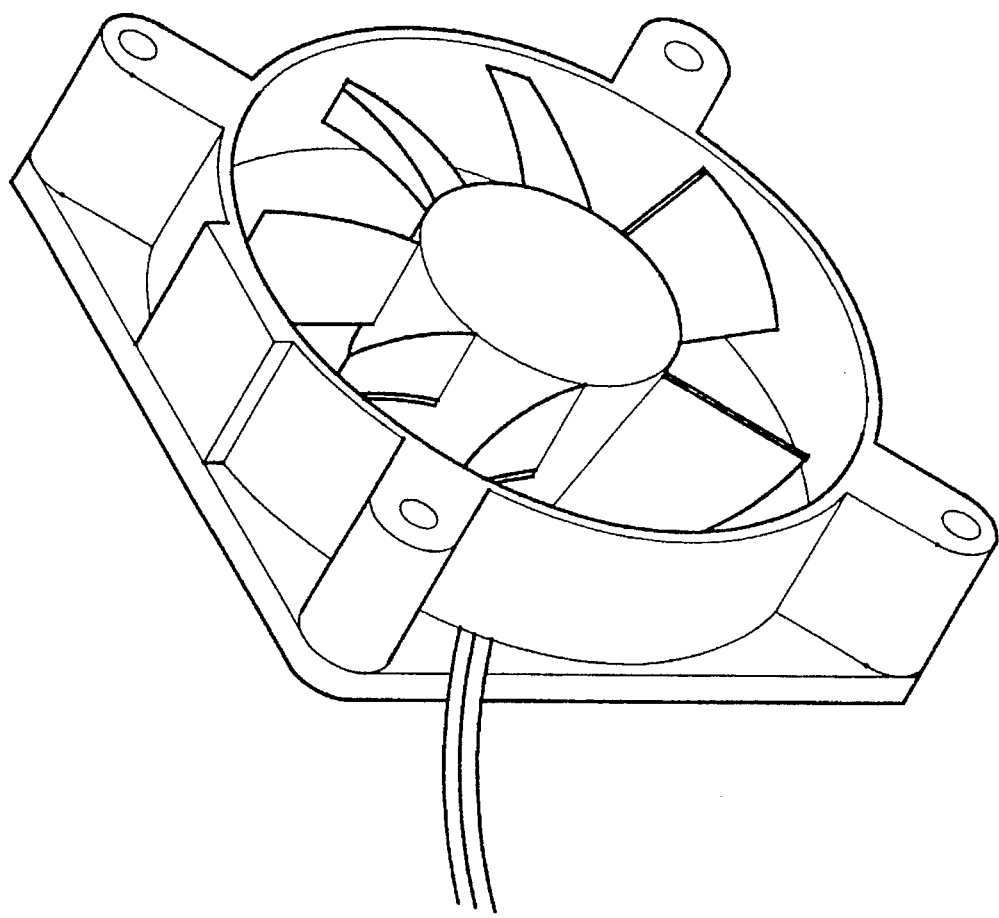
FIG. 1 is an elevational view of an axial-flow fan according to the prior art.

DETAILED DESCRIPTION OF THE
PREFERRED EMBODIMENT

Referring to FIGS. 3, 4, 5, and 6, a heat dissipating apparatus in accordance with the present invention is generally comprised of centrifugal fan 10, air hose 20, air duct 30, air outlet tube 40, rubber ring 50, and air duct holder 70.

Centrifugal fan 10 comprises an aluminum base plate, 10' a top cover 104, a circuit board 103, a winging 102, a bushing 1022, an axle bearing 1023, a fan body 101, and a connector 105. Aluminum base plate 10' has opposite pairs of notches 11 at two opposite lateral sides, a plurality of mounting holes 12 around the border, a circular center recess 13, which receives the circuit board 103, a center hole 14 at the center of the circular center recess 13, and a wire groove 15 radially extended from the circular center recess 13 to the border for mounting the electric wire. Winding 102 is mounted on the circuit board 103, defining a center hole 1021 aligned with a center through hole (not shown) on the circuit board 103 and the center hole 14 on the aluminum base plate 10'. Bushing 1022 is inserted into the center hole 1021 inside the winding 102 to hold the axle bearing 1023 on the inside. Fan body 101 has a fan shaft 106 (see FIG. 13) inserted through the axle bearing 1023 into the center hole 14 on the aluminum base plate 10' and retained in place by a clamp 1011, and a plurality of radial slant blades 1012 around the periphery. Top cover 104 is fastened to aluminum base plate 10', comprising a raised chamber 1041, which receives fan body 101, a plurality of ribs 1042 radially extended from the raised chamber 1041 on the outside, a plurality of mounting holes 1043 on the ribs 1042 respectively connected to the mounting holes 12 on aluminum base plate 10' by screws, an air outlet 1044 at one lateral side, and an air inlet 1045 at the center of the raised chamber 1041. Connector 105 has two supporting arms 1051 at two opposite ends respectively supported inside the air outlet 1044 at two opposite sides, two hooks 1052 respectively extended from the supporting arms 1051 and hooked on the periphery of the air outlet 1044, and a front coupling hole 1053 for coupling air hose 20.

Figure 6:
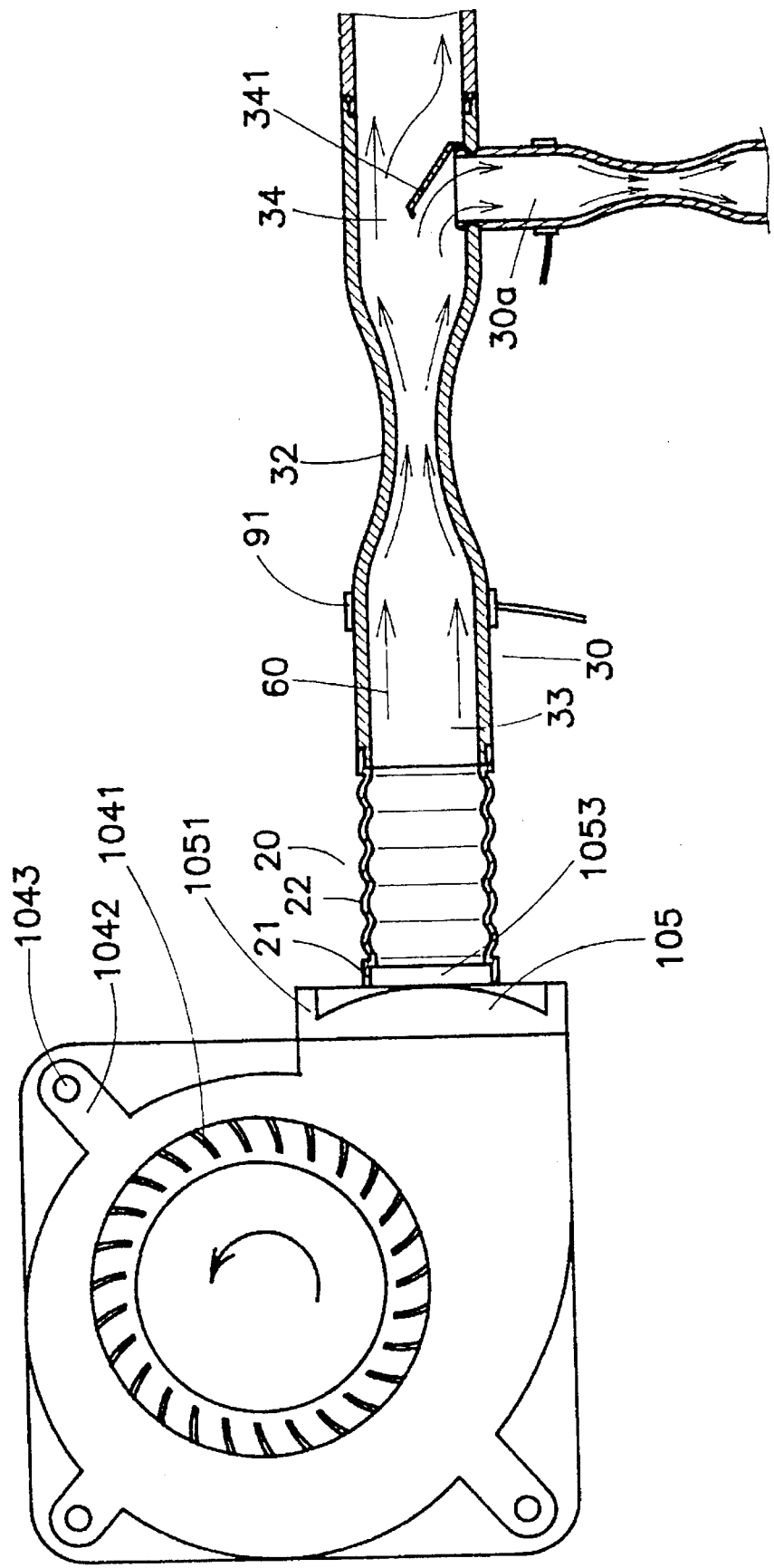
FIG. 6 is a side view in section of the heat dissipating apparatus shown in FIG. 4.

Referring to FIG. 6 and FIG. 5 again, centrifugal fan 10 is fastened to one end 21 of air hose 20. Air hose 20 is molded from flexible plastics, comprised of a bellows-like hose body 22 that can be bent in all directions. The opposite end of air hose 20 is connected to a coupling portion 31 at one end of air duct 30. Air duct 30 comprises a neck portion 32 in the middle. The boring of the air duct 30 is divided by the neck portion 32 into an air intake 33 and an air outlet 34. The diameters of the air intake 33 and the air outlet 34 are made gradually bigger in the reversed directions toward the outside. Therefore, when a current of air is driven into air duct 30 from the air intake 33 to the air outlet 34, the current of air is compressed when it enters the neck portion 32, and then released when it passes the neck portion 32. Air duct 30 further comprises at least one side hole 342 through the periphery of the air outlet 34 and sealed by an air valve flap 341 for mounting a branch air duct 30a. The structure of branch air duct 30a is identical to air duct 30. When the coupling portion 31 of branch air duct 30a is fitted into one side hole 342, the air valve flap 341 is opened to permit air to be driven from the air outlet 34 of air duct 30 into branch air duct 30a. The air outlet 34 of air duct 30 terminates in a coupling portion 35 fastened to a coupling portion 41 at one end of air outlet tube 40 and sealed by rubber ring 50. Air outlet tube 40 has longitudinal rows of holes 42 through which air is blown out of air outlet tube 40 to cool down the temperature of the components on the circuit board inside the computer mainframe. Air hose 20 may be connected either between air duct 30 and air outlet tube 40 or between fan 10 and air duct 30.

Referring to FIG. 6 again, currents of air 60 from fan 10 are driven into the air inlet 33 and then forced to pass through the neck portion 32. When passed through the neck portion 32, currents of air 60 flow out of the air outlet 34 into branch air duct 30a and air outlet tube 40. Furthermore, because the chamber 1041 is made of spiral shape, the amount of wind is gradually increased when it is moved toward the air outlet 1044, therefore a big amount of wind of high wind pressure is produced by centrifugal fan 10 and driven into hose 20.

Figure 7:
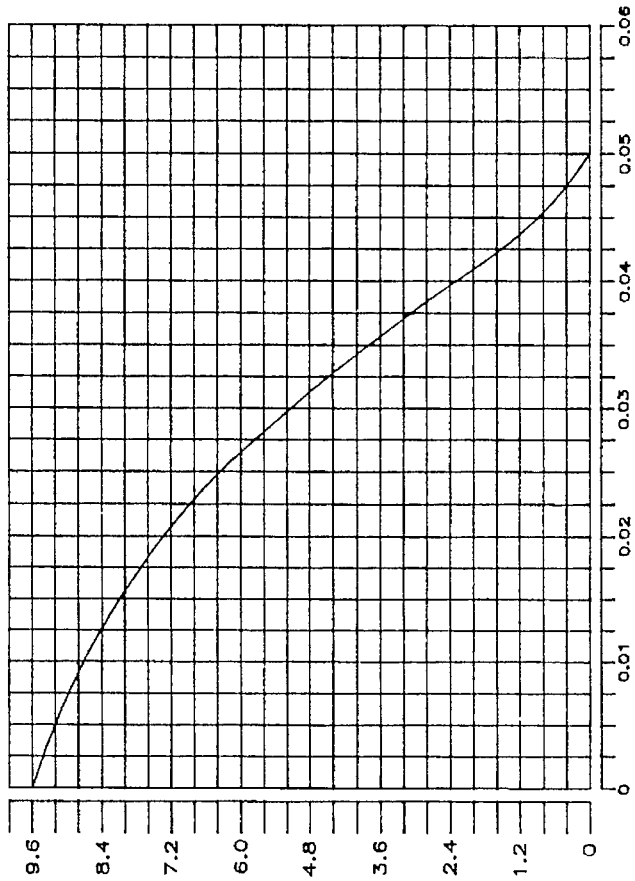
FIG. 7 is a wind pressure/amount of wind curve obtained from wind tunnel tests made on the fan shown in FIG. 3.
Figure 2:
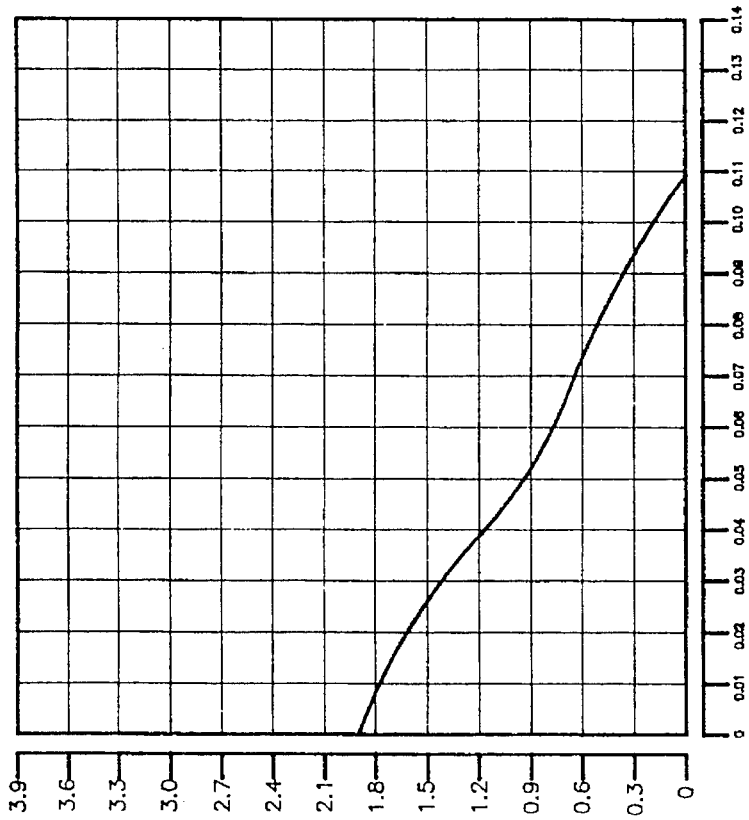
FIG. 2 is a wind pressure/amount of wind curve obtained from wind tunnel tests made on the axial flow fan shown in FIG. 1.
Figure 3:
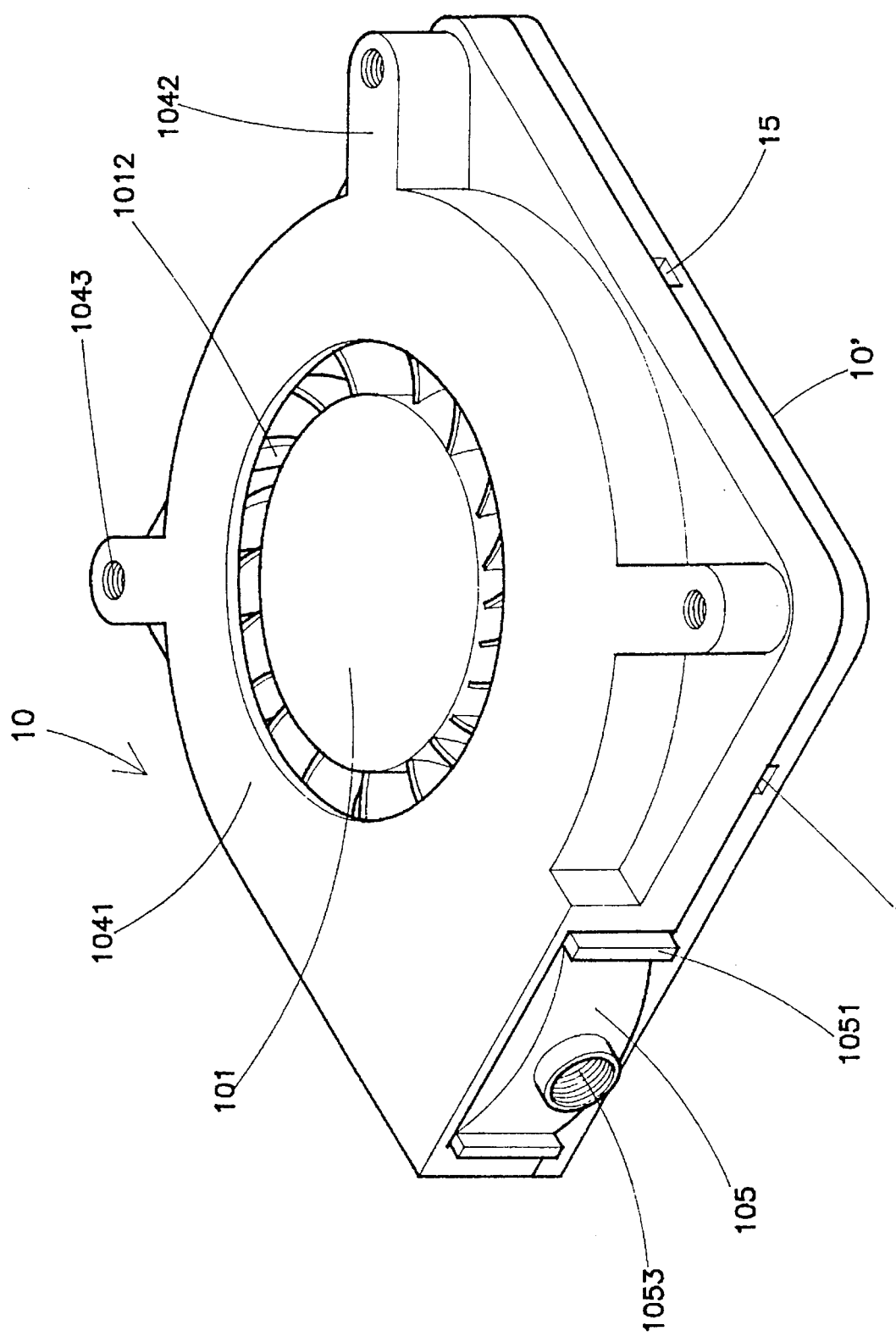
FIG. 3 is an elevational view of a fan according to the present invention.
Figure 4:
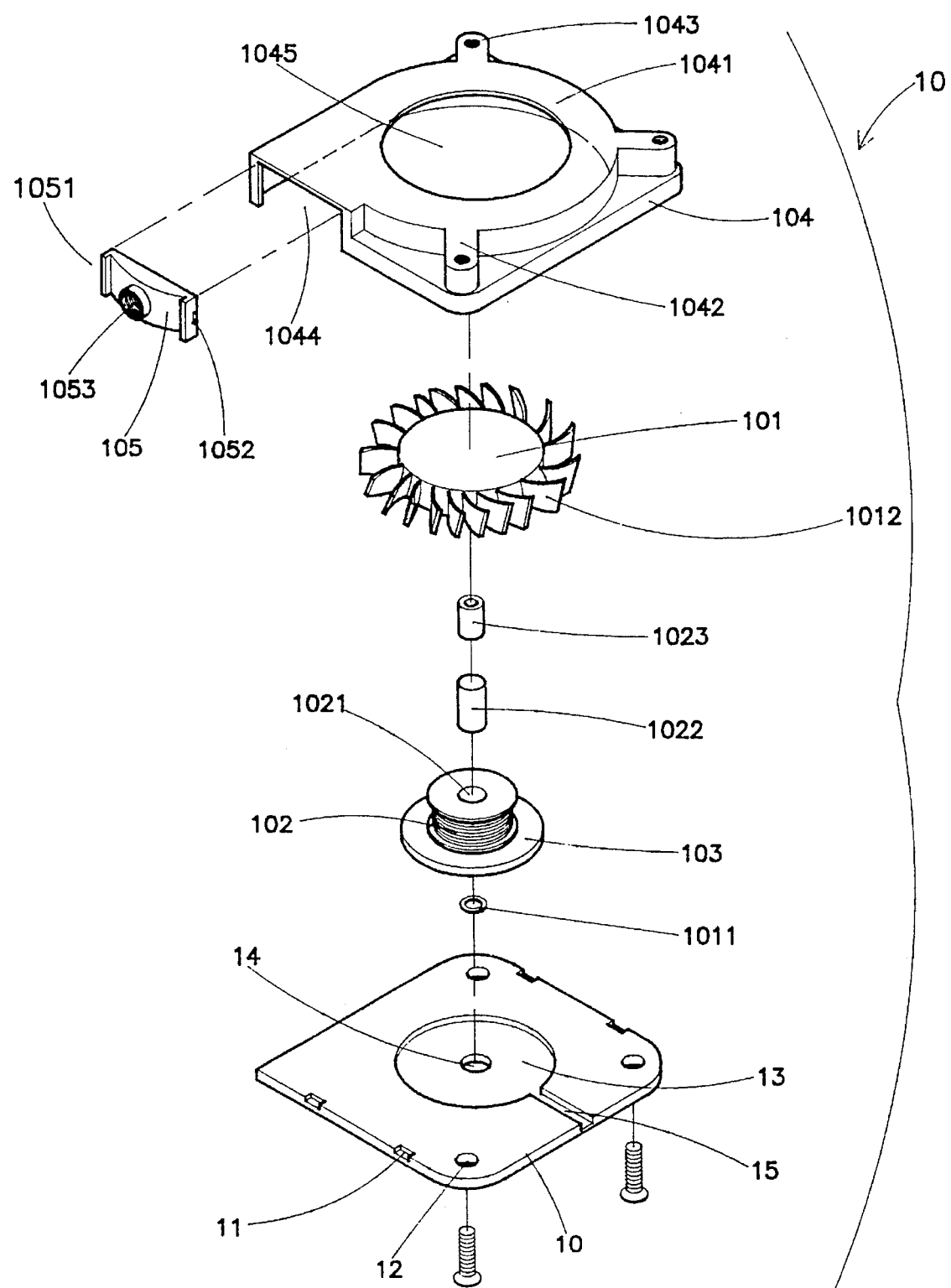
FIG. 4 is an exploded view of the fan shown in FIG. 3.
Figure 5:
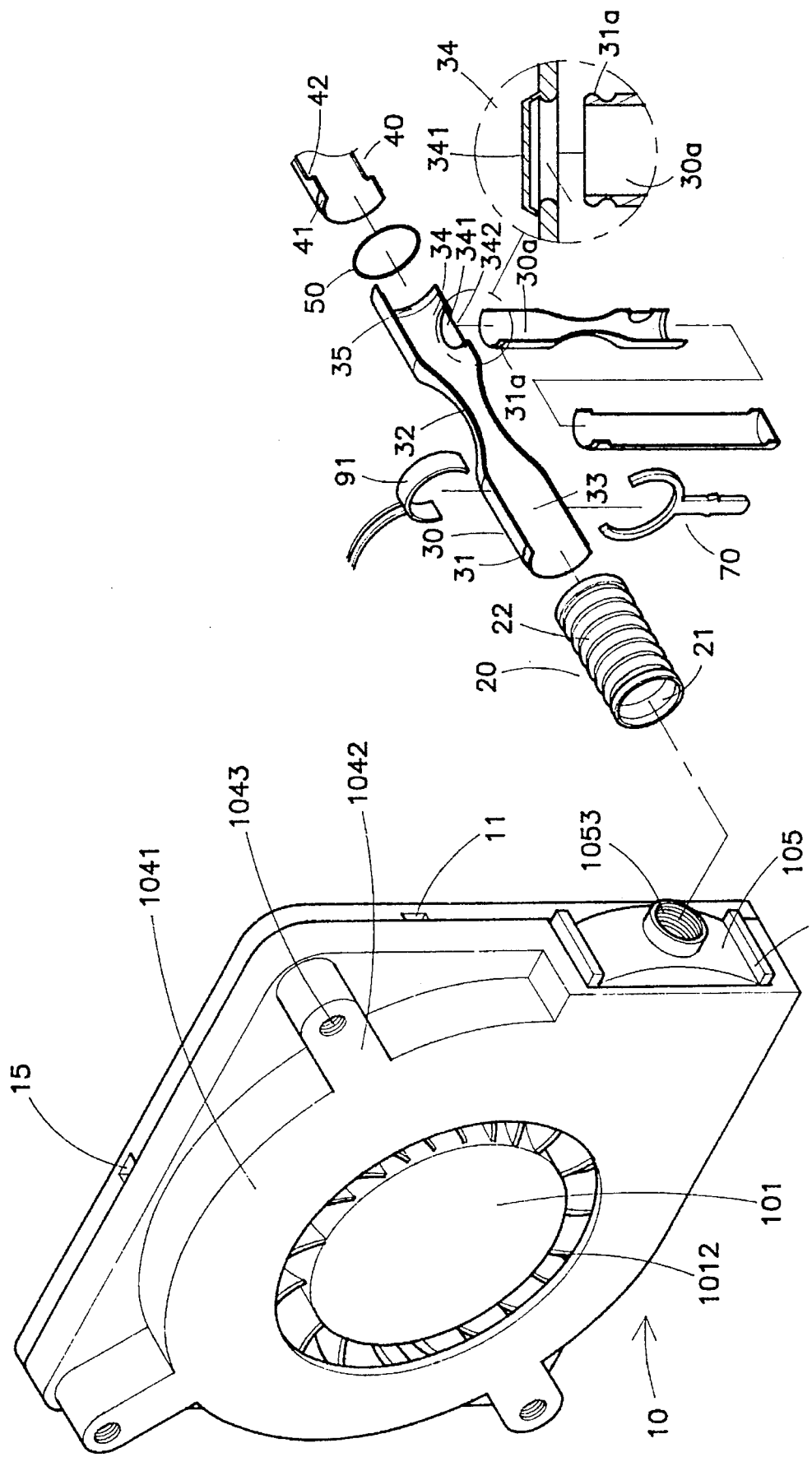
FIG. 5 is an exploded view of a heat dissipating apparatus according to the present invention.

FIG. 7 is a wind pressure/amount of wind curve obtained from wind tunnel tests made on fan 10, in which wind pressure is shown in X-axis, amount of wind is shown in Y-axis. As illustrated, fan 10 produces an amount of wind as high as 0.05 Q (CMC) and a wind pressure as high as 9.6 Ps (mmAg), therefore currents of wind can be delivered to a remote area.

Figure 8:
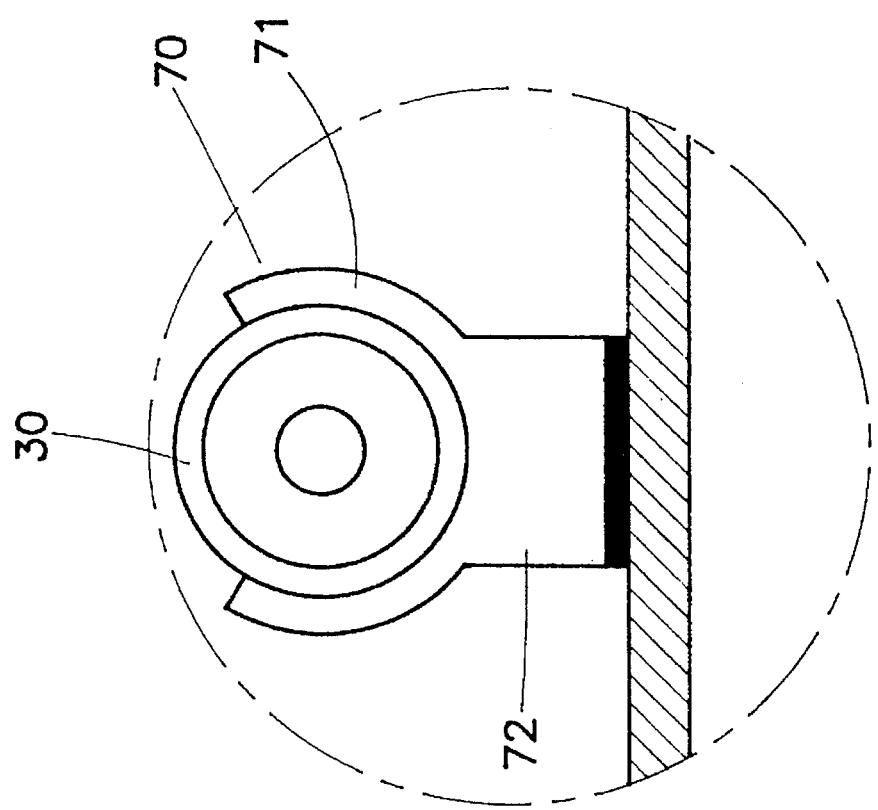
FIG. 8 shows an air duct holder installed according to the present invention.

Referring to FIG. 8, air duct holder 70 comprises a clamping portion 71 for clamping on air duct 30, a back-glued base 72 for surface-mounting on the circuit board.

Figure 9:
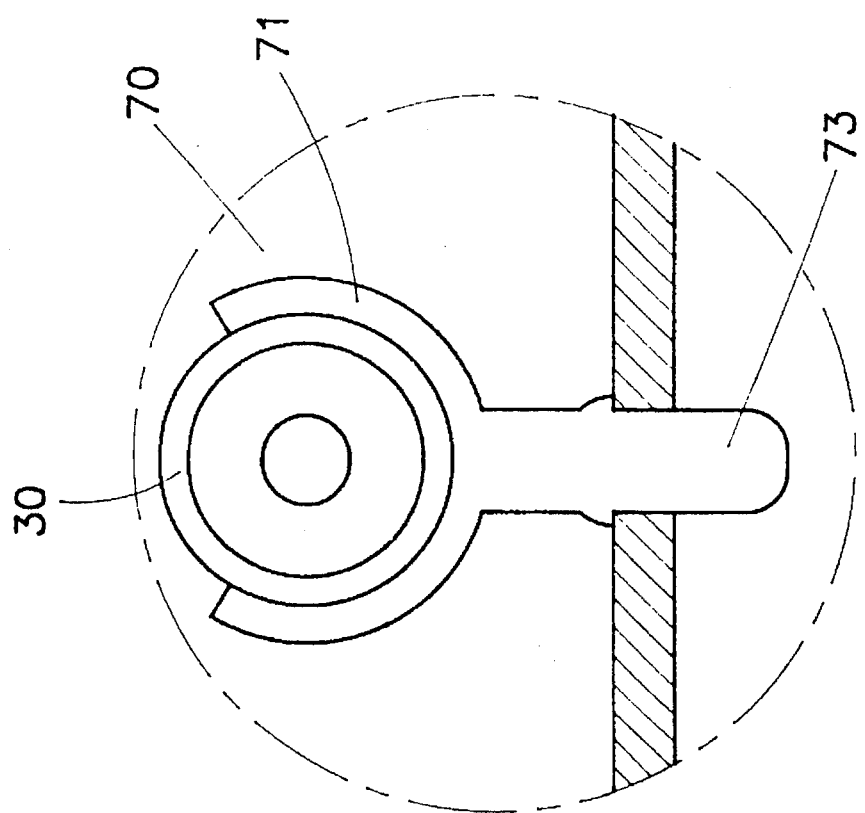
FIG. 9 shows an alternate form of the air duct holder installed.

FIG. 9 shows an alternate form of air duct holder 70. According to this alternate form, air duct holder 70 comprises a clamping portion 71 for clamping on air duct 30, and a plug rod 73 extended from the clamping portion 71 for fitting into a respective mounting hole on the circuit board.

Figure 10:
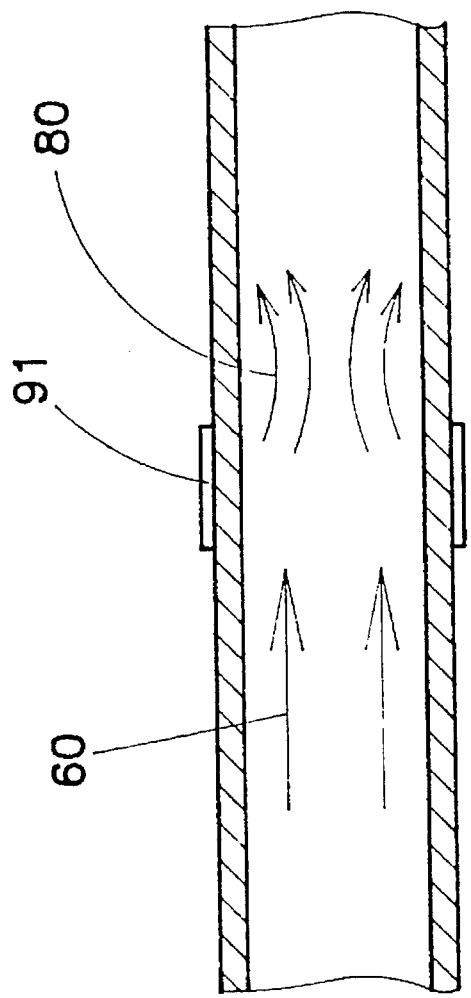
FIG. 10 shows a barrier of heat formed inside the air duct when the air duct is heated.
Figure 11:
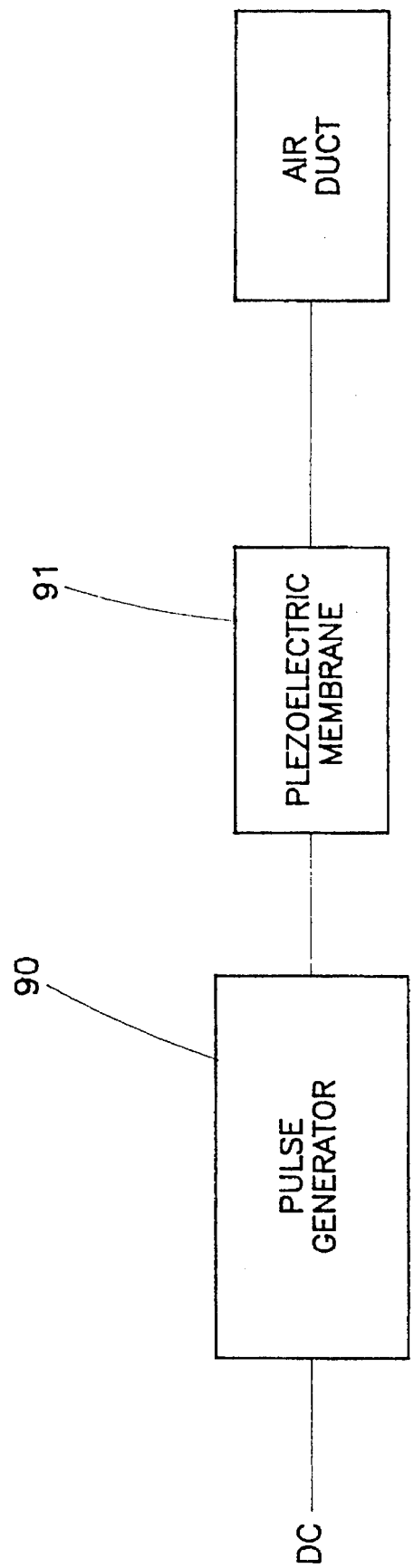
FIG. 11 is a circuit block diagram according to the present invention.

Referring to FIGS. 10 and 11, when air duct is installed in the computer mainframe and heated by the heat of the electronic components of the computer mainframe, a barrier of heat 80 will form around the inside wall of air duct to stop currents of air from passing through. This problem is eliminated by means of the operation of piezoelectric membrane 91. As shown in FIGS. 10 and 11, piezoelectric membrane 91 is mounted around the periphery of air duct and triggered by pulse generator 90 to vibrate the air duct at a frequency of between 30–300 Hz, causing the barrier of heat 80 to be destroyed.

Figure 12:
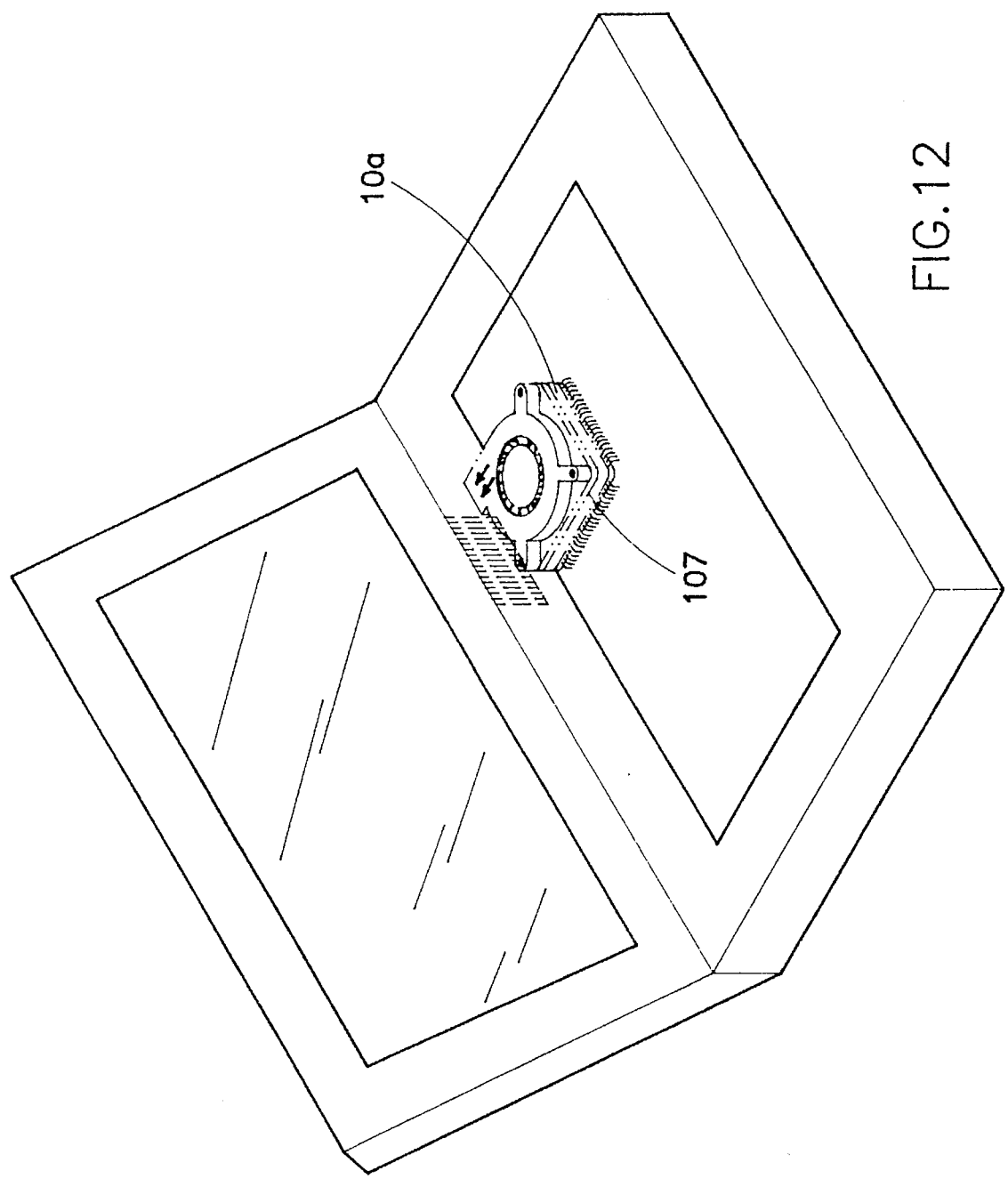
FIG. 12 shows the centrifugal fan adhered to the CPU inside a notebook computer according to the present invention.
Figure 13:
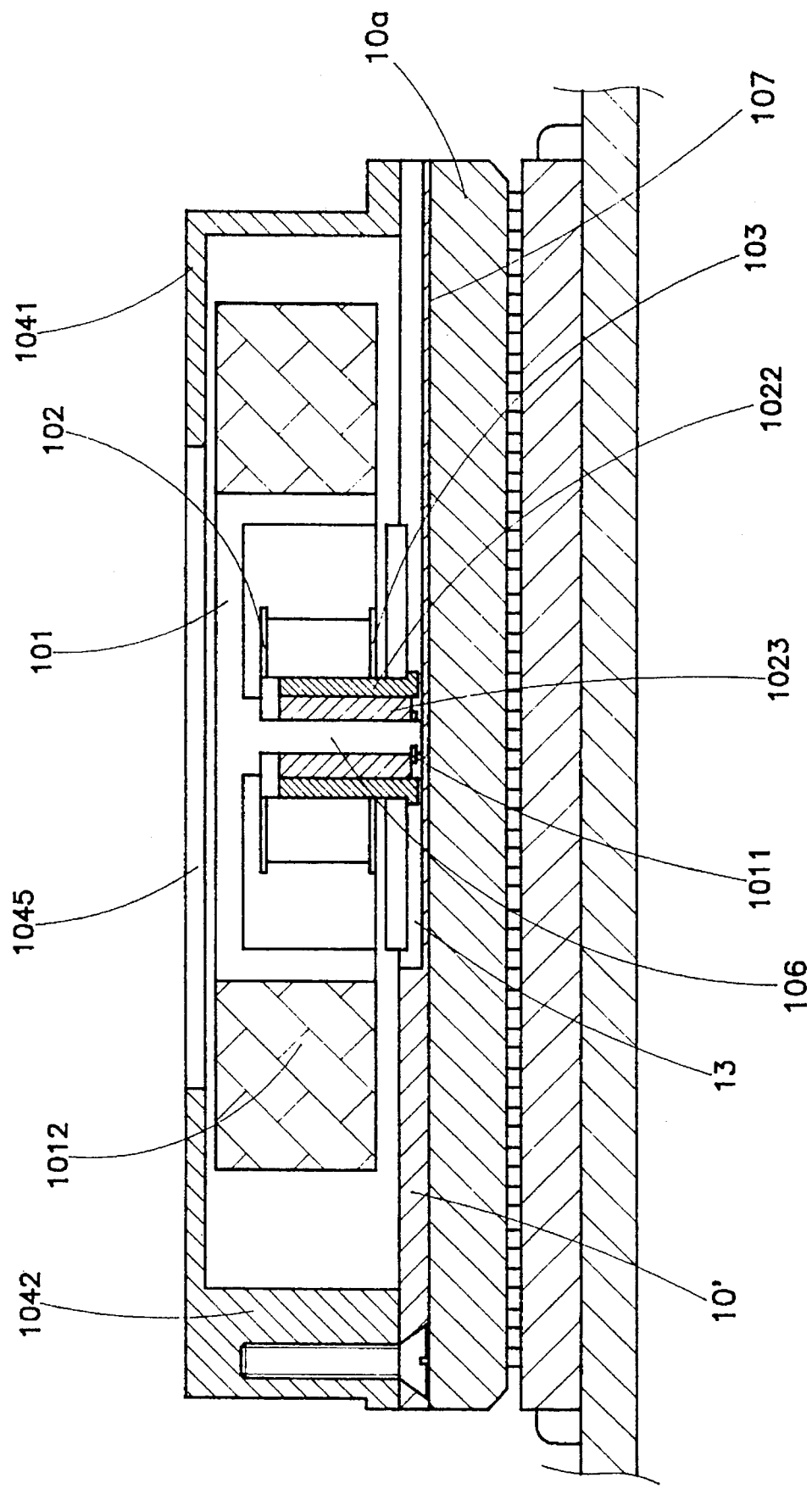
FIG. 13 is a sectional view in an enlarged scale taken on a part of FIG. 12, showing the centrifugal fan adhered to the CPU.

FIGS. 12 and 13 show an installation example according to the present invention, in which aluminum base plate 10' is adhered to the CPU 10a inside a notebook computer by a heat conductive adhesive tape 107. When fan body 101 is rotated to induce currents of air, heat is quickly carried away from the CPU 10a out of the air outlet 1044.

Figure 14:
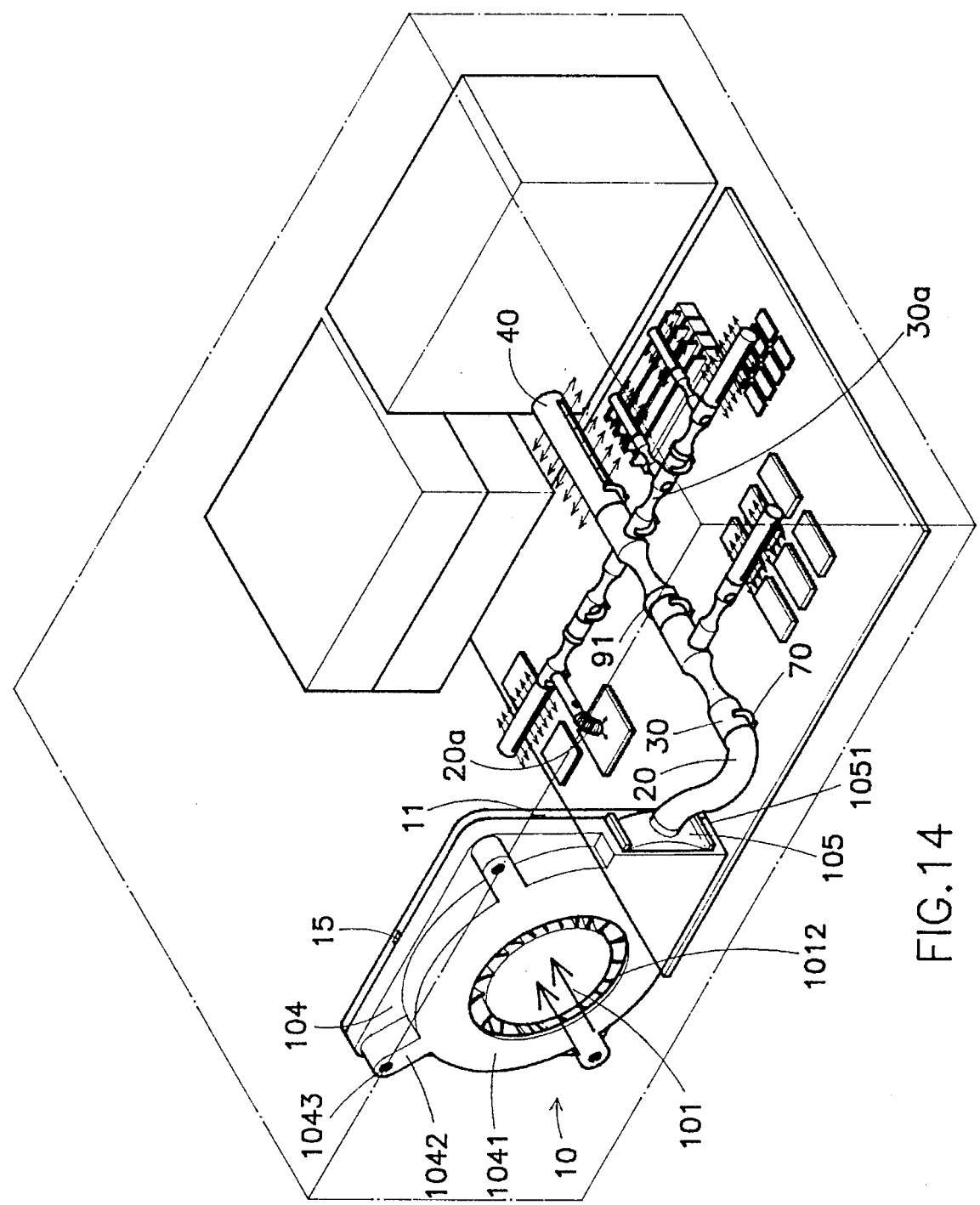
FIG. 14 is a perspective view showing the heat dissipating apparatus of the present invention installed in a computer mainframe and outside cooling air drawn into the computer mainframe.

FIG. 14 show another installation example according to the present invention, in which centrifugal fan 10 is controlled to blow currents of cooling air into the computer mainframe to cool down the electric parts and electronic components of the computer mainframe.

Figure 15:
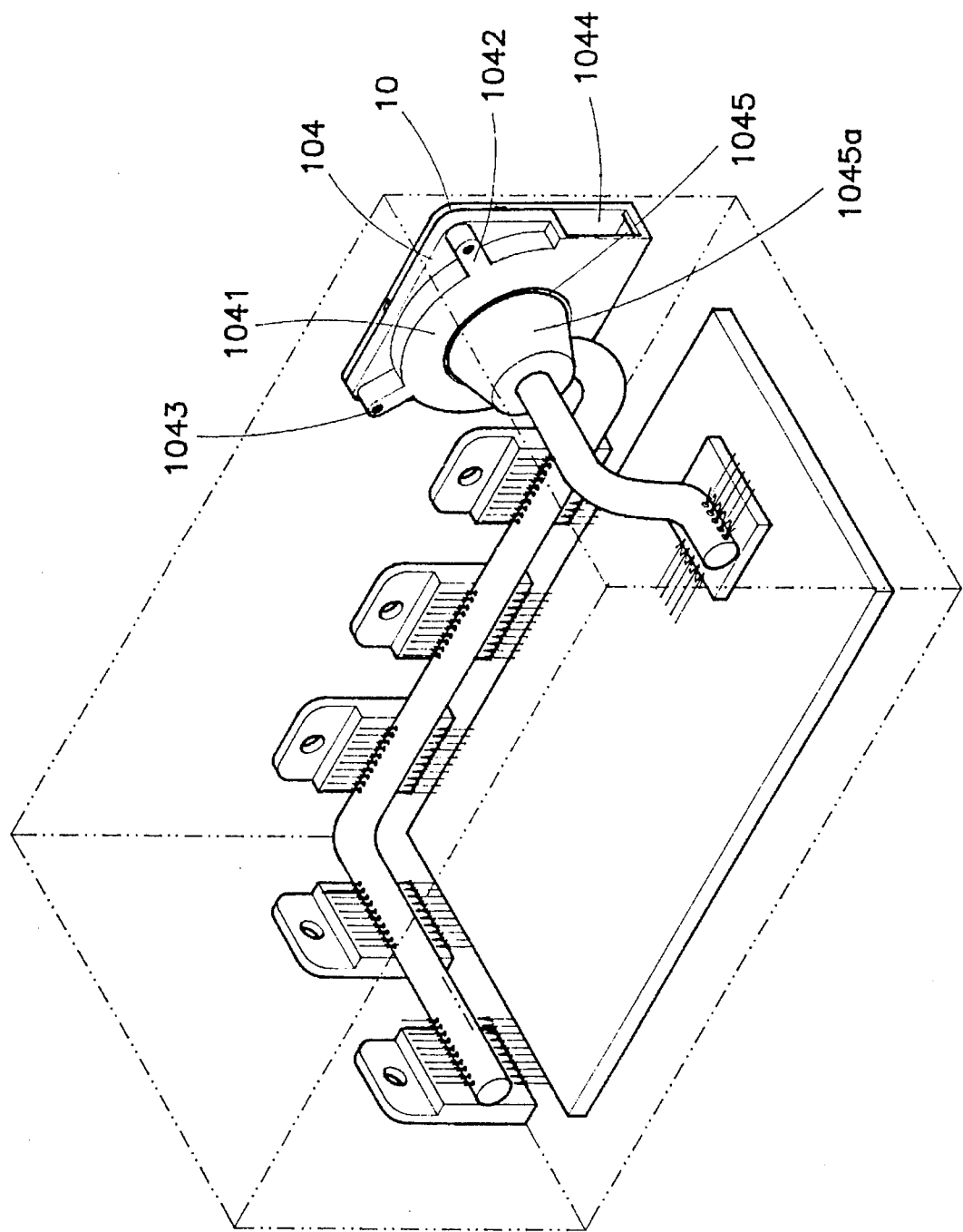
FIG. 15 shows another installation example of the centrifugal fan according to the present invention.

FIG. 15 shows centrifugal fan 10 installed in an electronic instrument and a suction pipe assembly 1045a is arranged inside the instrument and connected to the air inlet 1045 of centrifugal fan 10. When centrifugal fan 10 is operated, heat is quickly carried away from the instrument.

Figure 16:
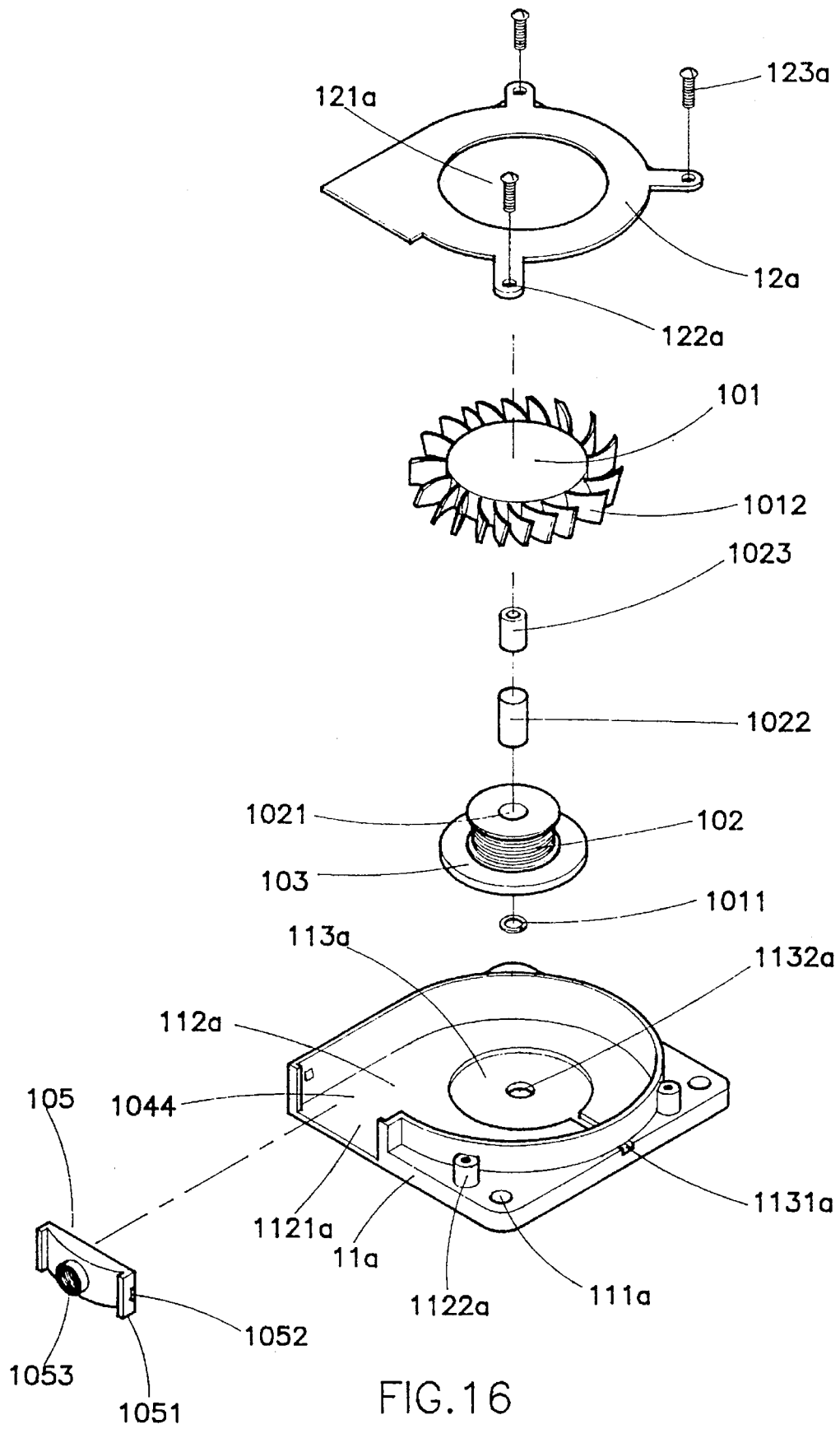
FIG. 16 is an exploded view of an alternate form of the centrifugal fan according to the present invention.

FIG. 16 is an exploded view of an alternate form of the centrifugal fan according to the present invention. This alternate form comprises an aluminum base plate 11a, a top cover 12a, a circuit board 103, a winging 102, a bushing 1022, an axle bearing 1023, a fan body 101, and a connector 105 the same reference numbers are used for parts that are identical in both forms of the fan. Aluminum base plate 11a comprises a plurality of mounting holes 111a around the border for mounting on a device wall, a spiral open chamber 112a, a circular center recess 113a inside the spiral open chamber 112a, which receives the circuit board 103, a center hole 1132a at the center of the circular center recess 113a, a wire groove 1131a extended from the circular center recess 113a through the spiral open chamber 112a to the border for mounting the electric wire, an air outlet 1121a communicated with the spiral open chamber 112a, and a plurality of upright posts 1122a outside the spiral open chamber 112a around the border. Winding 102 is mounted on the circuit board 103, defining a center hole 1021 aligned with a center through hole (not shown) on the circuit board 103 and the center hole 1132a on the aluminum base plate 11a. Bushing 1022 is inserted into the center hole 1021 inside the winding 102 to hold the axle bearing 1023 on the inside. Fan body 101 has a fan shaft (not shown) inserted through the axle bearing 1023 into the center hole 1132a on the aluminum base plate 11a and retained in place by a clamp 1011, and a plurality of radial slant blades 1012 around the periphery. Top cover 12a is fastened to aluminum base plate 11a, having a plurality of radial lugs 122a respectively fastened to the upright posts 1122a on the aluminum base plate 11a by a respective screw, and an air inlet 121a for letting outside air be drawn into the spiral open chamber 112a. Connector 105 has two supporting arms 1051 at two opposite ends respectively supported inside the air outlet 1044 at two opposite sides, two hooks 1052 respectively extended from the supporting arms 1051 and hooked on the periphery of the air outlet 1044, and a front coupling hole 1053 for coupling air hose 20.

It is to be understood that the drawings are designed for the purposes of illustration only, and are not intended as a definition of the limits and scope of the invention disclosed.

What is claimed is:

1. A heat dissipating apparatus installed in an instrument to dissipate heat, the heat dissipating apparatus comprising an air duct system consisting of a plurality of air hoses, main air ducts, branch air ducts and air outlet tubes all engaged to produce said air duct system, a fan controlled and engaged to said air duct system to draw air in or out of said air duct system, a plurality of air duct holders installed in the instrument to hold said air duct system in place, a plurality of piezoelectric membranes respectively mounted on said air duct system and controlled by pulse generating means for vibrating said air duct system so as to destroy a barrier of heat inside said air duct system, said fan comprised of an aluminum base plate, a top cover, a circuit board, a winding, a bushing, an axle bearing, a fan body, and a connector, said aluminum base plate having a circular center recess, which receives said circuit board, a center hole at the center of said circular center recess, and a wire groove radially extended from said circular center recess to an edge of said aluminum base for mounting an electric wire, said winding being mounted on said circuit board and defining a center hole aligned with a center through hole on said circuit board and the center hole on said aluminum base plate, said bushing being inserted into the center hole of said winding to hold said axle bearing on the inside, said fan body having a fan shaft inserted through said axle bearing into the center hole on said aluminum base plate and retained in place by a clamp, and a plurality of radial slant blades around a periphery of said fan body, a chamber engaged between said top cover and said aluminum base plate which receives said fan body, and has an air outlet at one lateral side and an air inlet at the center of said chamber, said connector having two supporting arms at two opposite ends respectively supported inside said air outlet at two opposite sides, a hook, each said hook extended from each of said supporting arms hooked on a periphery of said air outlet, and a front coupling hole for coupling an air hose of said air hoses.

2. The heat dissipating apparatus of claim 1 wherein said chamber is formed in a spiral shape.

3. The heat dissipating apparatus of claim 1 wherein the structure of said branch air ducts is identical to said main air ducts.

4. The heat dissipating apparatus of claim 1 wherein an air hose of said air hoses is connected between a main air duct of said main air ducts and said fan.

5. The heat dissipating apparatus of claim 1 wherein said air hoses are molded from flexible plastics.

6. The heat dissipating apparatus of claim 1 wherein each said air duct holders comprises a clamping portion clamped on said air duct system, and a back-glued base extended from said clamping portion and surface-mounted on the inside of the instrument.

7. The heat dissipating apparatus of claim 1 wherein said air duct holders each comprises a clamping portion clamped on said air duct system, and a plug rod extended from said clamping portion and fitted into a respective mounting hole on the inside of the instrument.

8. The heat dissipating apparatus of claim 1 wherein said piezoelectric membranes are triggered by said pulse generating means to vibrate a periphery of said air duct system at a frequency within 30–300 Hz.

9. The heat dissipating apparatus of claim 1 wherein said aluminum base plate of said fan is covered with a heat conductive adhesive tape for adhering to a CPU of a computer for permitting heat to be quickly carried away from the CPU when said fan is operated to cause currents of air.

10. The heat dissipating apparatus of claim 1 wherein an air hose of said air hoses is connected between a main air duct of said main air ducts and an air outlet tube of said air outlet tubes.

* * * * *